(12) United States Patent
Henehan

(10) Patent No.: US 10,321,666 B2
(45) Date of Patent: Jun. 18, 2019

(54) HAND HELD BIRD FEEDING ASSEMBLY

(71) Applicant: Matthew Henehan, Highlands Ranch, CO (US)

(72) Inventor: Matthew Henehan, Highlands Ranch, CO (US)

( * ) Notice: Subject to any disclaimer, the term of this patent is extended or adjusted under 35 U.S.C. 154(b) by 158 days.

(21) Appl. No.: 15/434,428

(22) Filed: Feb. 16, 2017

(65) Prior Publication Data

US 2018/0228132 A1   Aug. 16, 2018

(51) Int. Cl.
A01K 39/02 (2006.01)
A45F 5/10 (2006.01)
B65D 41/04 (2006.01)

(52) U.S. Cl.
CPC ............ *A01K 39/0206* (2013.01); *A45F 5/10* (2013.01); *B65D 41/04* (2013.01); *A45F 2005/1006* (2013.01); *A45F 2200/05* (2013.01)

(58) Field of Classification Search
CPC .............................. A01K 39/0206; A01K 39/02
See application file for complete search history.

(56) References Cited

U.S. PATENT DOCUMENTS

| | | | | |
|---|---|---|---|---|
| 5,725,152 A * | 3/1998 | Akyu | ...................... | A61L 9/127 239/45 |
| 5,996,127 A | 12/1999 | Leslie | | |
| 6,499,430 B2 * | 12/2002 | Garcia-Lucio | ........... | A01K 7/00 119/72 |
| D522,119 S * | 5/2006 | Baraky | ........................ | D23/366 |
| 7,789,040 B2 * | 9/2010 | Liethen | ................. | A01K 39/012 119/57.8 |
| D683,912 S | 6/2013 | Muhr et al. | | |
| 8,539,910 B1 * | 9/2013 | Hensley | ............. | A01K 39/0206 119/72 |
| D698,099 S * | 1/2014 | Muhr | ........................... | D30/124 |
| D698,102 S | 1/2014 | Muhr et al. | | |
| 8,763,556 B1 | 7/2014 | Vaughn, Jr. | | |
| 9,655,345 B1 * | 5/2017 | Hill | ..................... | A01K 39/0206 |
| 2004/0103851 A1 * | 6/2004 | Hunter | ................... | A01K 39/02 119/72 |
| 2006/0201431 A1 | 9/2006 | Peterson | | |
| 2008/0087225 A1 | 4/2008 | Lin | | |
| 2009/0308321 A1 * | 12/2009 | Szczygiel-Durante | ...................... | A01K 39/02 119/72 |
| 2010/0024738 A1 * | 2/2010 | Chen | .................. | A01K 39/0113 119/72 |

* cited by examiner

*Primary Examiner* — Kristen C Hayes

(57) ABSTRACT

A hand held bird feeding assembly includes a container that has a bottom wall and a perimeter wall that is attached to and extends upwardly from the bottom wall. An upper portion of the container distal to the bottom wall tapers inward. An opening extends into a top end of the container. An artificial flower is attached to the container adjacent to the opening. A feeding fluid is placed within the container and can be used to feed a hummingbird from the container as the container is being held.

9 Claims, 5 Drawing Sheets

HAND HELD BIRD FEEDING ASSEMBLY

CROSS REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to bird feeding devices and more particularly pertains to a new bird feeding device for allowing a person to hand feed a hummingbird.

(2) Description of Related Art Including Information Disclosed Under 37 CFR 1.97 and 1.98

The prior art relates to bird feeding devices.

BRIEF SUMMARY OF THE INVENTION

An embodiment of the disclosure meets the needs presented above by generally comprising a container that has a bottom wall and a perimeter wall that is attached to and extends upwardly from the bottom wall. An upper portion of the container distal to the bottom wall tapers inward. An opening extends into a top end of the container. An artificial flower is attached to the container adjacent to the opening. A feeding fluid is placed within the container and can be used to feed a hummingbird from the container as the container is being held.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
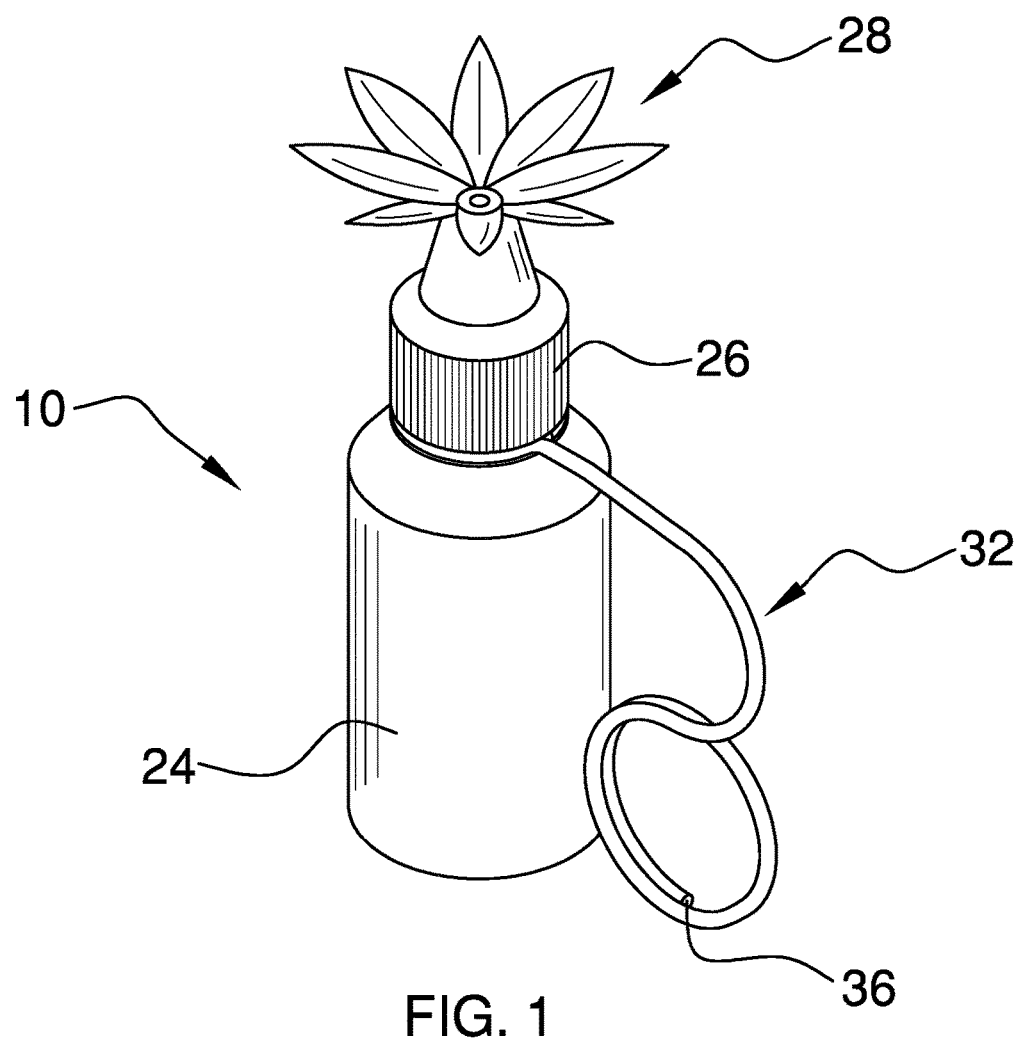
FIG. 1 is a top perspective view of a hand held bird feeding assembly according to an embodiment of the disclosure.
Figure 2:
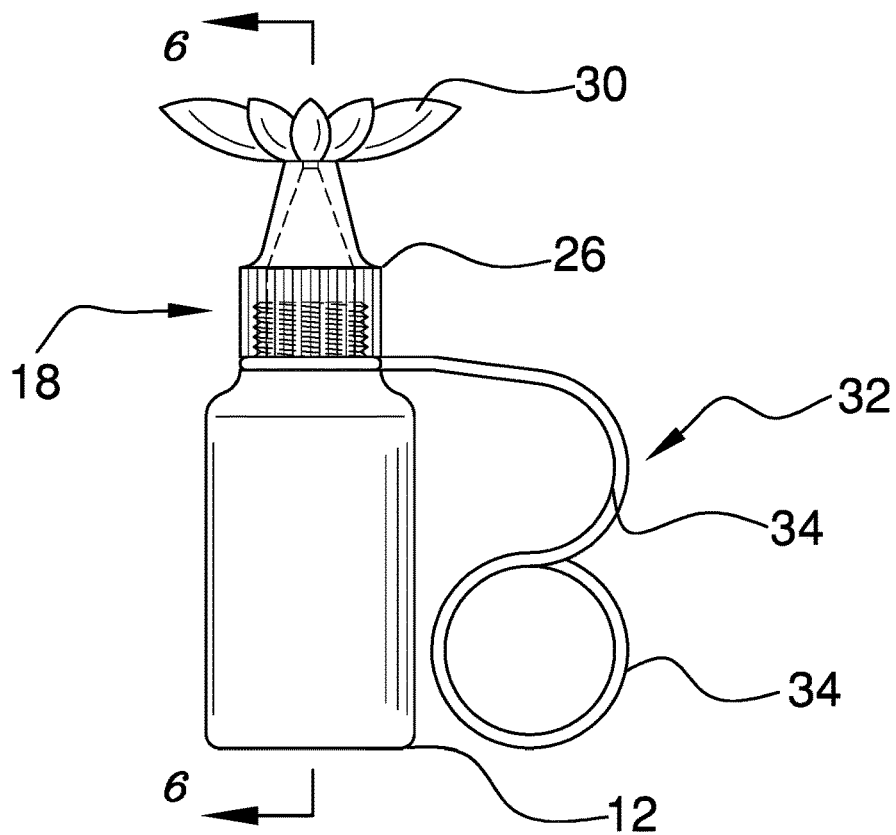
FIG. 2 is a side view of an embodiment of the disclosure.
Figure 3:
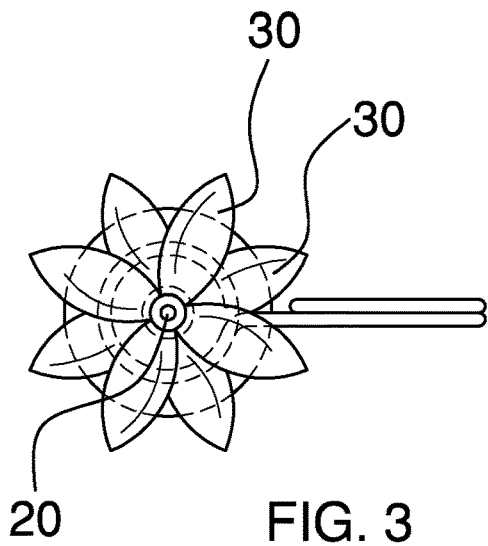
FIG. 3 is a top view of an embodiment of the disclosure.

With reference now to the drawings, and in particular to FIGS. 1 through 6 thereof, a new bird feeding device embodying the principles and concepts of an embodiment of the disclosure and generally designated by the reference numeral 10 will be described.

As best illustrated in FIGS. 1 through 6, the hand held bird feeding assembly 10 generally comprises a container 12 having a bottom wall 14 and a perimeter wall 16 that is attached to and extends upwardly from the bottom wall 14. An upper portion 18 of the container 12 distal to the bottom wall 14 tapers inward. An opening 20 extends into a top end 22 of the container 12. The opening 20 has a diameter is between $1/16$ of an inch and $1/4$ of an inch. The container 12 has a height from the bottom wall 14 to the top end 22 between 2.5 inches and 5.0 inches. The container 12 includes a body component 24 and a cap component 26 threadably coupled together. The cap component 26 includes the top end 22. The cap component 26 is removable from the body component 24 and the body component 24 is configured to receive a fluid for feeding a humming bird 40. The fluid is conventional and includes a nectar like fluid of high sugar content.

An artificial flower 28 is attached to the container 12 adjacent to the opening 20. The top end 22 extends through a central area of the artificial flower 28 such that pedals 30 of the artificial flower 28 radiate outwardly from the top end 22. The artificial flower 28 has a diameter taken perpendicular to an axis of the opening 20 of between 1.0 inches and 2.0 inches. The artificial flower 28 may be comprised of flexible or rigid material and may be colored or shaped to look like any particular flower known to attract hummingbirds.

Figure 5:
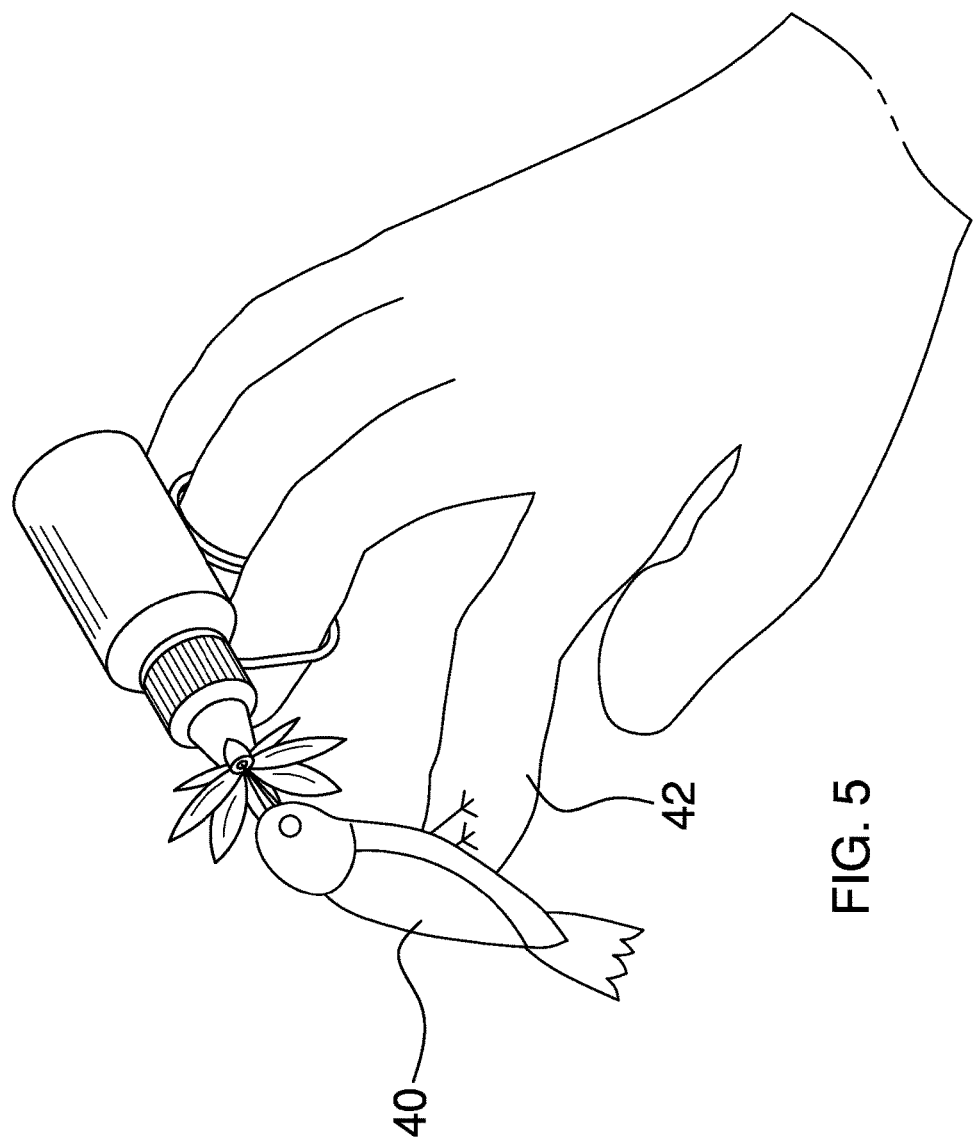
FIG. 5 is a perspective in-use view of an embodiment of the disclosure.
Figure 6:
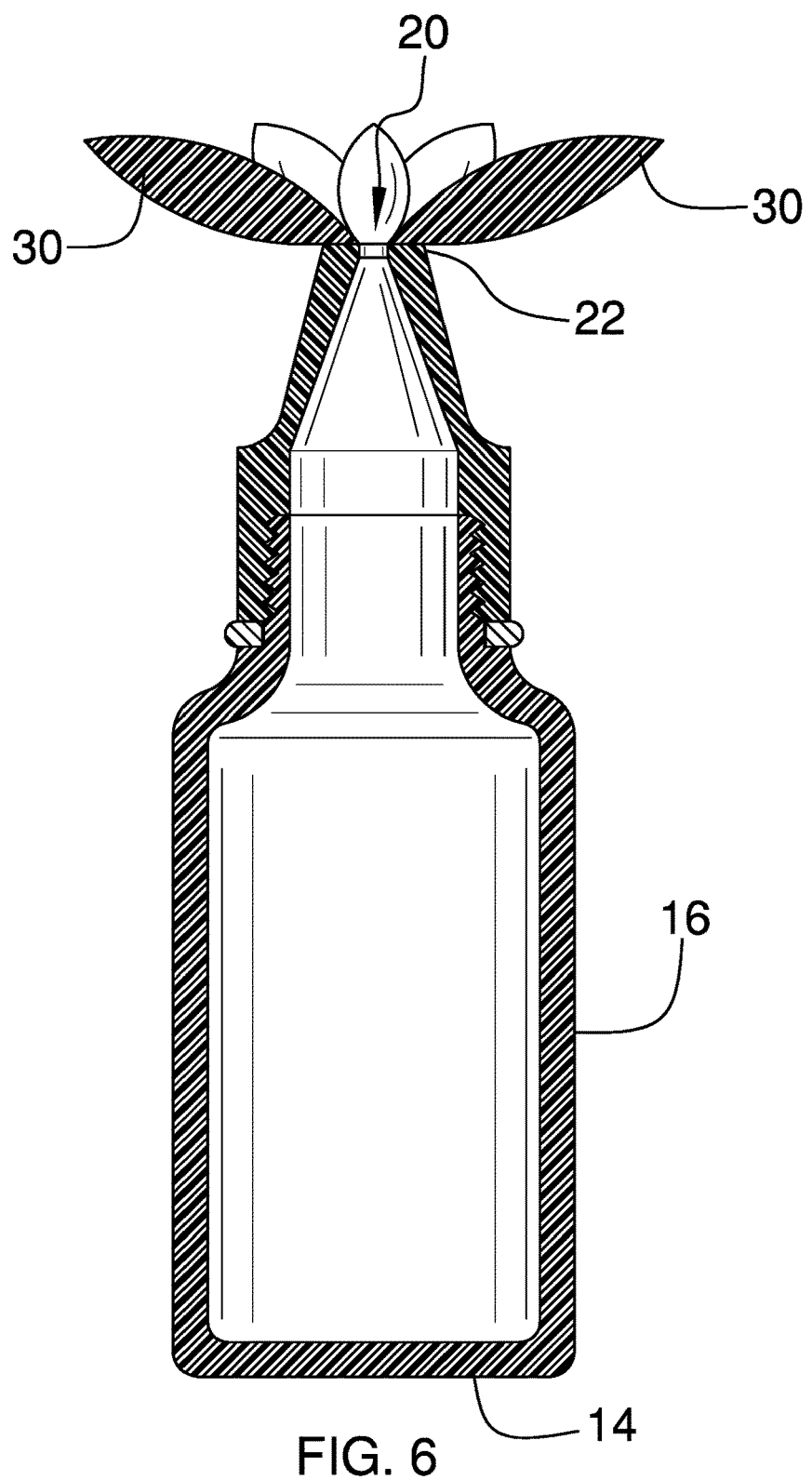
FIG. 6 is a cross-sectional view of an embodiment of the disclosure taken along line 6-6 of FIG. 2.

A grip 32 is attached to the container 12 to facilitate holding of the container 12. The grip 32 includes a pair of finger receivers 34. At least one of the finger receivers 34 forms a closed loop 36. Each of the finger receivers 34 is aligned with each other and positioned on a same side of the container 12 with respect to each other. This allows a user to control the angle of the container 12 easily as seen in FIG. 5, while keeping one finger free to act as a perch 42 for the hummingbird 40.

Figure 4:
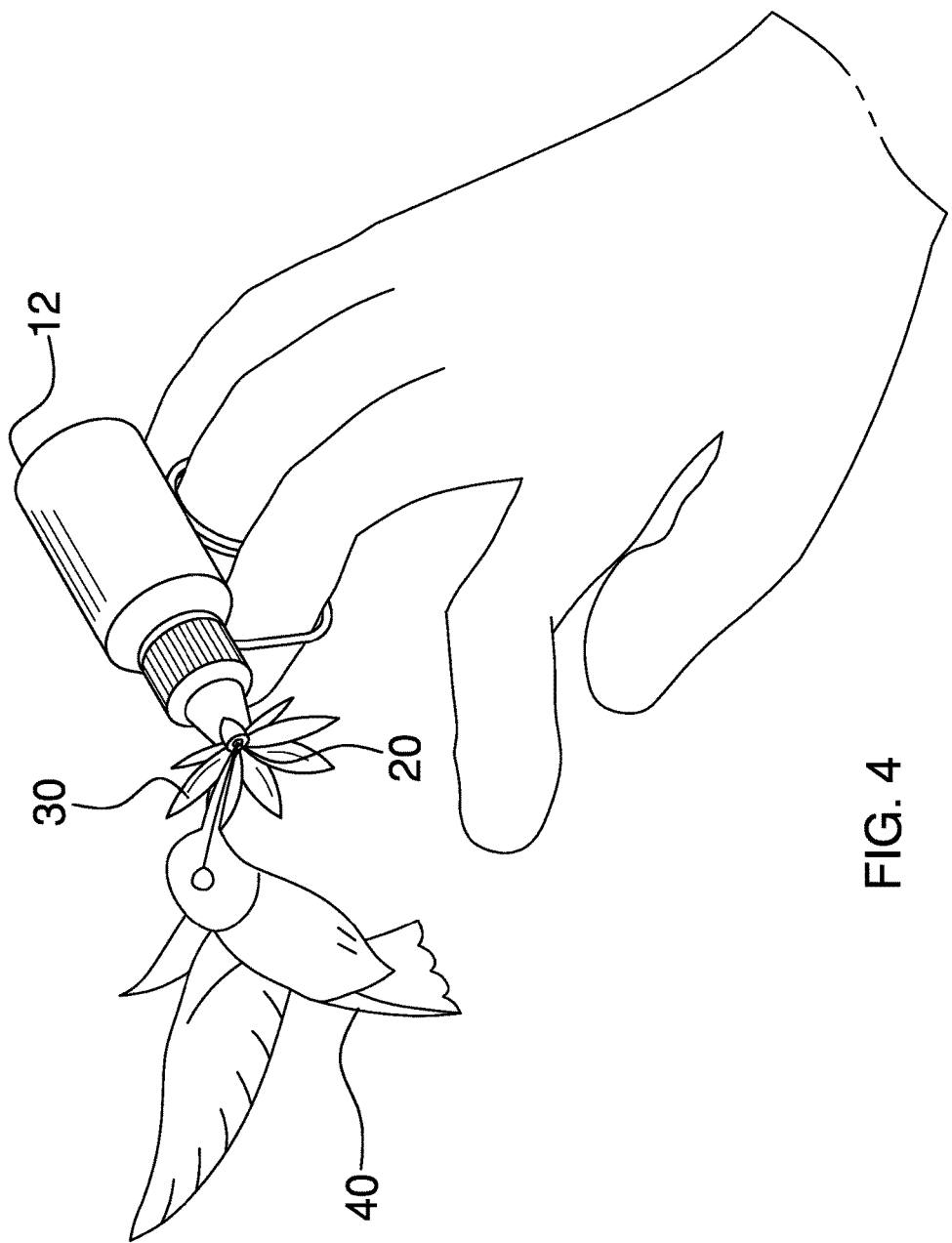
FIG. 4 is a perspective in-use view of an embodiment of the disclosure.

In use, a user will first set up a feeding station to cause hummingbirds 40 to become accustomed to feeding from artificial flowers in the area the user wishes to hand feed the bird. After one to two weeks of the hummingbirds 40 feeding at the feeding station, the user will fill the container 12 with nectar or a sugar solution and hold it generally horizontally as shown in FIGS. 4 and 5 so that the hummingbird 40 may access the opening and drink from the container. The artificial flower 28 will remove the anxiety from the hummingbird 40 so that is will feed from the container 12 directly.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bird feeding assembly to facilitate feeding a humming bird, said assembly comprising:
    a container having a bottom wall and a perimeter wall being attached to and extending upwardly from said bottom wall, an upper portion of said container distal to said bottom wall tapering inward, an opening extending into a top end of said container;
    an artificial flower being attached to said container adjacent to said opening, said top end being positioned in a central area of said artificial flower such that petals of said artificial flower radiate outwardly from said top end; and
    a grip being attached to said container to facilitate holding of said container.

2. The bird feeding assembly to facilitate feeding a humming bird according to claim 1, wherein said opening has a diameter being between 1/16 of an inch and 1/4 of an inch.

3. The bird feeding assembly to facilitate feeding a humming bird according to claim 1, wherein said container has a height from said bottom wall to said top end between 2.5 inches and 5.0 inches.

4. The bird feeding assembly to facilitate feeding a humming bird according to claim 1, wherein said container includes a body component and a cap component threadably coupled together, said cap component including said top end, said cap component being removable from said body component and said body component being configured to receive a fluid for feeding a humming bird.

5. The bird feeding assembly to facilitate feeding a humming bird according to claim 1, wherein said grip includes a pair of finger receivers.

6. The bird feeding assembly to facilitate feeding a humming bird according to claim 5, wherein at least one of said finger receivers forms a closed loop.

7. The bird feeding assembly to facilitate feeding a humming bird according to claim 6, wherein each of said finger receivers is aligned with each other and positioned on a same side of said container with respect to each other.

8. A bird feeding assembly to facilitate feeding a humming bird, said assembly comprising:
    a container having a bottom wall and a perimeter wall being attached to and extending upwardly from said bottom wall, an upper portion of said container distal to said bottom wall tapering inward, an opening extending into a top end of said container; and
    an artificial flower being attached to said container adjacent to said opening, said top end being positioned in a central area of said artificial flower such that petals of said artificial flower radiate outwardly from said top end, said artificial flower having a diameter taken perpendicular to an axis of said opening of between 1.0 inches and 2.0 inches.

9. A bird feeding assembly to facilitate feeding a humming bird, said assembly comprising:
    a container having a bottom wall and a perimeter wall being attached to and extending upwardly from said bottom wall, an upper portion of said container distal to said bottom wall tapering inward, an opening extending into a top end of said container, said opening having a diameter being between 1/16 of an inch and 1/4 of an inch, said container having a height from said bottom wall to said top end between 2.5 inches and 5.0 inches, said container including a body component and a cap component threadably coupled together, said cap component including said top end, said cap component being removable from said body component and said body component being configured to receive a fluid for feeding a humming bird;
    an artificial flower being attached to said container adjacent to said opening, said top end being positioned in a central area of said artificial flower such that petals of said artificial flower radiate outwardly from said top end, said artificial flower having a diameter taken perpendicular to an axis of said opening of between 1.0 inches and 2.0 inches; and
    a grip being attached to said container to facilitate holding of said container, said grip including a pair of finger receivers, at least one of said finger receivers forming a closed loop, each of said finger receivers being aligned with each other and positioned on a same side of said container with respect to each other.

* * * * *